(12) United States Patent
Waggoner et al.

(10) Patent No.: US 10,410,376 B1
(45) Date of Patent: Sep. 10, 2019

(54) VIRTUAL REALITY MEDIA CONTENT DECODING OF PORTIONS OF IMAGE FRAMES

(71) Applicant: Amazon Technologies, Inc., Seattle, WA (US)

(72) Inventors: Charles Benjamin Franklin Waggoner, Portland, OR (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 312 days.

(21) Appl. No.: 15/276,630

(22) Filed: Sep. 26, 2016

(51) Int. Cl.
 *H04N 5/76* (2006.01)
 *G06T 9/00* (2006.01)
 *G06T 3/60* (2006.01)

(52) U.S. Cl.
 CPC .................. *G06T 9/00* (2013.01); *G06T 3/60* (2013.01); *G06T 2219/2016* (2013.01)

(58) Field of Classification Search
 None
 See application file for complete search history.

(56) References Cited

U.S. PATENT DOCUMENTS

| | | | |
|---|---|---|---|
| 6,536,043 B1* | 3/2003 | Guedalia | H04N 7/147 348/E7.071 |
| 9,363,535 B2* | 6/2016 | Chen | H04N 19/50 |
| 2005/0062858 A1* | 3/2005 | Kouramanis | G09G 5/363 348/231.3 |
| 2006/0028489 A1* | 2/2006 | Uyttendaele | G06T 15/205 345/646 |
| 2014/0016708 A1* | 1/2014 | Wang | H04N 19/70 375/240.25 |
| 2015/0054913 A1* | 2/2015 | Annau | G11B 27/11 348/36 |
| 2016/0012855 A1* | 1/2016 | Krishnan | G11B 27/105 386/241 |
| 2016/0219289 A1* | 7/2016 | Saunders | H04N 19/395 |
| 2017/0026659 A1* | 1/2017 | Lin | H04N 19/597 |
| 2017/0251227 A1* | 8/2017 | Dvir | H04N 19/176 |
| 2017/0277256 A1* | 9/2017 | Burns | G02B 27/0093 |
| 2017/0330382 A1* | 11/2017 | Adamov | G06T 15/005 |
| 2018/0077209 A1* | 3/2018 | So | G06F 3/04815 |
| 2018/0139431 A1* | 5/2018 | Simek | H04N 13/232 |
| 2018/0192033 A1* | 7/2018 | Gallup | H04N 5/247 |
| 2018/0242016 A1* | 8/2018 | Lee | H04N 19/597 |

* cited by examiner

*Primary Examiner* — Iman K Kholdebarin
(74) *Attorney, Agent, or Firm* — Weaver Austin Villeneuve & Sampson LLP

(57) ABSTRACT

Techniques are described for decoding portions of image frames for virtual reality (VR) media content. A field of view of a viewer within a VR environment can be determined and used to decode a portion of an image frame that provides image content for that portion. The other portions of the image frame that are not within the image frame can remain non-decoded when not in the visible field of view.

15 Claims, 9 Drawing Sheets

VIRTUAL REALITY MEDIA CONTENT DECODING OF PORTIONS OF IMAGE FRAMES

BACKGROUND

Consumers have an ever-increasing array of options for consuming media content, in terms of the types of media content (e.g., video, audio, text, games, etc.), providers of the media content, and devices for consuming media content. Media content providers are becoming increasingly sophisticated and effective at providing media content quickly and reliably to consumers.

Some devices for consuming media content include immersive devices that can simulate a user's physical presence within a virtual reality (VR) environment. For example, a VR headset can include sensors to recognize a user moving her head, and therefore, change her perspective within the VR environment. As a result, the display of the media content needs to be adjusted to reflect the user's movement. Unfortunately, image frames for VR environments can be difficult to decode since they include a large amount of image data, resulting in reduced visual quality and increased latency for adjusting the display if the user changes perspective.

DETAILED DESCRIPTION

Figure 1:
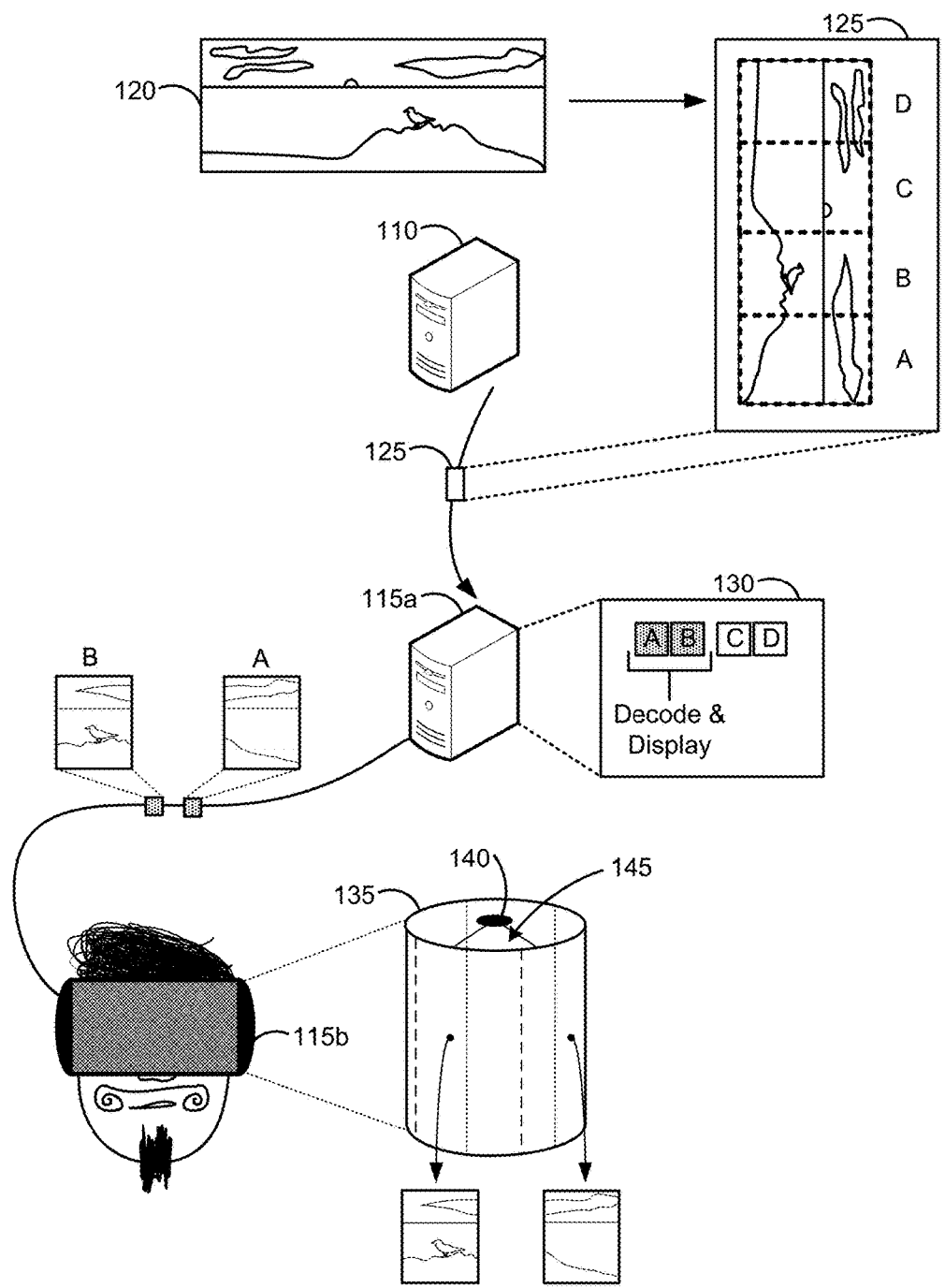
FIG. 1 illustrates an example of decoding a portion of an image frame based on a field of view of a virtual reality (VR) environment.

This disclosure describes media content encoding and decoding techniques for improving the playback experience of media content for virtual reality (VR) environments. For example, in some video coding formats (or video compression formats), image frames of media content are segmented into different portions during the encoding process. In standards such as H.264/MPEG-4 Advanced Video Coding (AVC), H.265/High Efficiency Video Coding (HEVC), or SMPTE VC-1, portions of an image frame might be split into different slices, each slice being a square or rectangular region of the image frame that is independently encoded and decoded from other slices of the same image frame. That is, a slice can be encoded and decoded without reference to other portions of the same frame. Image frames can also be segmented into different tiles, for example, with the HEVC and VP9 standards. Tiles also represent different portions of an image frame, and are generally rectangular, but can be other, irregular shapes. Additionally, in H.264/AVC, different portions of an image frame can be segmented using flexible macroblock ordering (FMO), in which the different portions do not have to be contiguous. For example, two FMOs can be used to represent a "checkerboard" of portions of an image frame with every other square block of 16×16 pixels of the checkerboard belonging to one FMO and the remaining squares belonging to a second FMO. In some scenarios, slices, tiles, and FMOs are used to group together similar portions of an image frame to allow for more efficient encoding of media content.

As described below, slices, tiles, and FMOs can also be used to designate portions of an image frame to be displayed based on a field of view of the user within the VR environment. For example, media content can be encoded by determining different slices of an image frame of the media content. Since slices are generally longer in the horizontal axis than the vertical axis and are supposed to be vertically adjacent to other slices, the image frame can also be rotated, for example, by 90 degrees in a clockwise or counter-clockwise orientation. This results in portions of the rotated image frame designated as slices "stacked" upon each other. The rotated image frame can then be provided to a VR device for storage in a buffer.

The image frame can be projected onto a cylindrical projection displayed by the VR device. As a result, the different slices represent different segments of the cylindrical projection. As the viewer causes a virtual camera of the VR environment to shift (e.g., by the viewer moving his head), different segments of the cylindrical projection should be displayed on a display screen of the VR device. The VR device can decode and render (including rotating) specific slices needed to display the segments within a field of view of the virtual camera. The remaining slices (i.e., slices not including image content that is within the field of view, such as the slices representing image data that is behind the user within the VR environment) can remain non-decoded since they do not need to be displayed. This results in a lower computational load on the VR device to decode the media content, and therefore, the latency (or time) to update the display to reflect the new field of view can be reduced. Additionally, since only a portion of the image frame is decoded, the resolution of details of the image frame can be increased, improving the quality of the playback experience. As a result, the playback experience of the VR device can be improved.

In other implementations, tiles or FMOs can be used in a similar manner. In some of those other implementations, the image frame can be encoded and decoded without rotations.

In more detail, FIG. 1 illustrates an example of decoding a portion of an image frame based on a field of view of a virtual reality (VR) environment. In FIG. 1, image frame 120 is encoded by encoding server 110 to generate encoded image frame 125. Encoded image frame 125 is rotated 90 degrees clockwise (with respect to image frame 120) and four slices A, B, C, and D are identified as including different portions of the content of the image frame. For example, each slice might represent a different 90-degree portion of a 360-degree cylindrical projection of image frame 120. In the simplified example of FIG. 1, encoded image frame 125 can be provided by encoding server 110 to a VR device, which includes VR device component 115a including one or more processors and memory, and VR device component 115b including a display and sensors. However, in other implementations, encoded image frame 125 can be provided to a media server (e.g., of a media service) which can be contacted by the VR device for the encoded image frames. Though depicted as separate components in FIG. 1 coupled with a cable, VR device components 115a and 115b can be integrated into a single housing of a VR device. For example, the processors and memory of VR device component 115a can be integrated into a headset also including the display and sensors. VR device component 115a stores encoded image frame 125 within image frame buffer 130. Image frame buffer 130 can also store several other image frames of the media content being played back by the VR device.

As the viewer interacts with the VR environment, for example, by moving his head, the display of VR device component 115b should update with new image content to reflect a new view or perspective within the VR environment. For example, in FIG. 1, image frame 120 might be mapped (or projected) upon cylindrical projection 135, providing 360-degree image content for virtual camera 140 within the center of cylindrical projection 135. Virtual camera 140 can represent the current view of the viewer within the VR environment. If the field of view of virtual camera 140 is 90 degrees, then 25% of the 360 degrees of cylindrical projection 135 should be displayed by VR device component 115b. For example, field of view 145 of virtual camera 140 should view parts of slices A and B since slices A and B overlap with or are within field of view 145. Slices C and D provide image data for cylindrical projection 135 that should not be displayed since they are outside of field of view 145 of virtual camera 140. As a result, the VR device decodes slices A and B in image frame buffer 130 and displays the portions of slices A and B within field of view 145 onto the display of the VR device. However, since slices C and D represent image data outside of field of view 145, they can remain non-decoded, reducing the computational load to decode image frames, and therefore, reduce the latency to update the display to reflect the current state of field of view 145.

Figure 2:
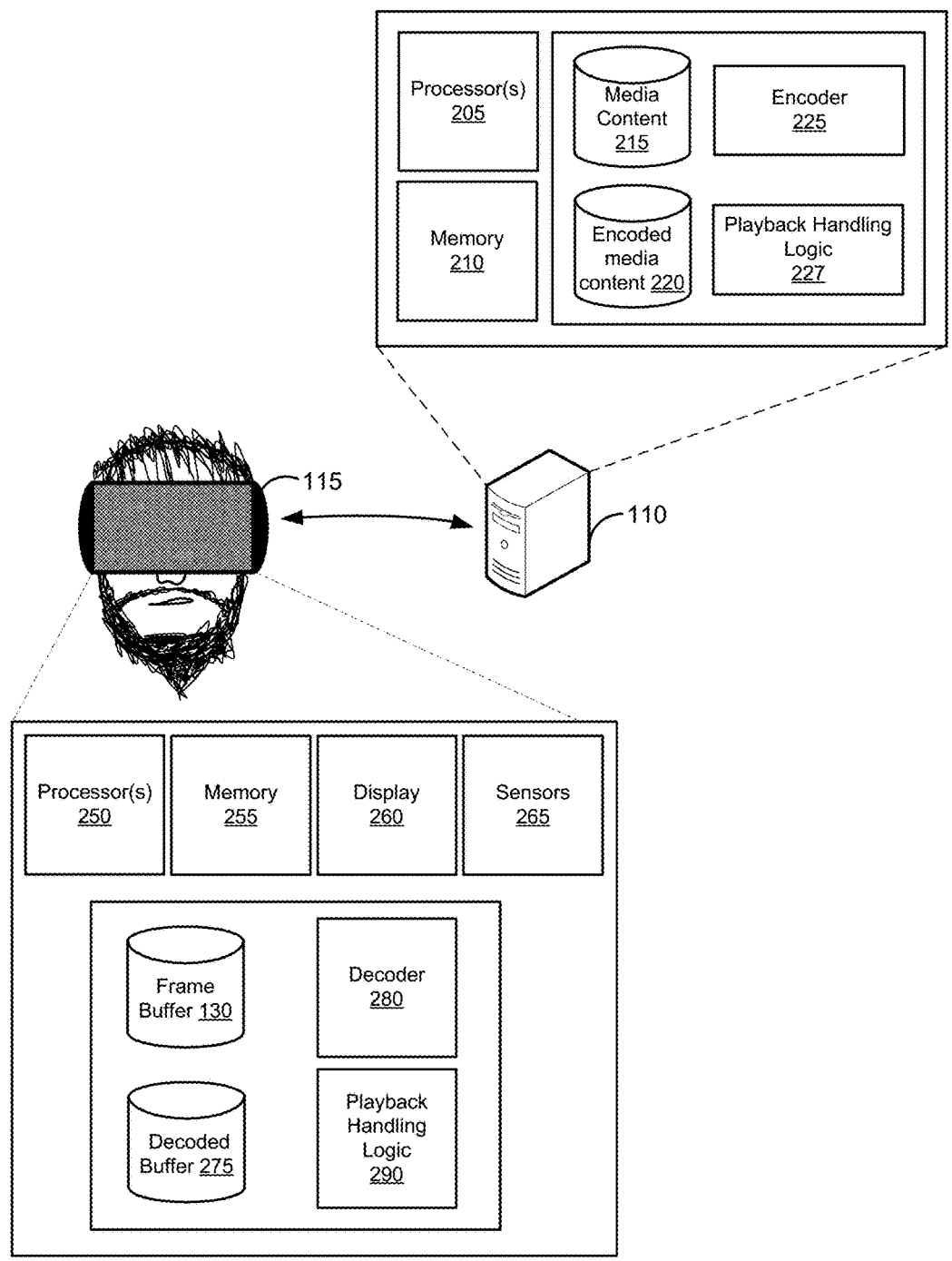
FIG. 2 illustrates an example of a computing environment for decoding a portion of an image frame.

FIG. 2 illustrates an example of a computing environment for decoding a portion of an image frame. The computing environment of FIG. 2 includes encoding server 110 that can be used to encode media content played back by VR device 115. VR device 115 can decode the encoded media content and play back image frames on a display. VR device 115 can be a headset, monitor, television, or other type of electronic device including one or more displays.

Encoding server 110 can conform to any of a wide variety of architectures and its functionality may be implemented by a variety of servers. For example, one server might encode media content and the encoded media content might be provided to another server, for example, belonging to a content delivery network (CDN). As such, the functionality and components of encoding server 110 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the encoding and delivery of media content and data related to the media content, including content providers, internet service providers (ISPs), providers of content delivery networks (CDNs), etc. The functionality described herein also may be implemented by one or more different entities. For example, the functionality to provide playback of media content can be integrated into a video player or software client under control of one entity (e.g., on viewer devices 205a-e), integrated into a separate app from another entity, implemented in an edge server or content server of a CDN, a server of an ISP, etc. In some implementations, media content can be streamed in fragments from encoding server 110. In other implementations, encoding server 110 can encode the media content and the entire media content can be downloaded to VR device 115. In some implementations, media content can be encoded by encoding server 110 and provided to VR device 115 via a physical medium (e.g., a disc such as DVD, Blu-Ray, etc.).

It should be noted that, despite references to particular computing paradigms and software tools herein, the computer program instructions on which various implementations disclosed herein are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

In FIG. 2, encoding server 110 can include various types of logic to implement encoder 225 to encode media content stored in media content 215 and store encoded media content in memory such as encoded media content 220. In some implementations, encoding server 110 can be part of a VR content service that also includes playback handling logic 227 to receive requests for media content and provide the requested media content from encoded media content 220. As a result, the VR content service can include a variety of distributed servers, some to encode the media content (e.g., including the functionality of encoder 225) and some to delivery encoded media content (e.g., including the functionality of playback handling logic 227). Encoding server 110 can include one or more processors 205, memory 210, and other hardware components or circuits to encode media content and provide the encoded media content to VR device 115. For example, processors 205 can execute stored instructions in memory 210 to implement the encoding and playback techniques disclosed herein.

VR device 115 can also include various types of logic used to implement a decoder to decode the encoded media content and store the decoded media, as well as playback handling logic to request and/or play back the decoded media content on a display screen of VR device 115. VR device 115 can include one or more processors 250, memory 255, display screen 260, and sensors 265 to play back the decoded media content. For example, display screen 260 might include one or more display screens (e.g., one display screen for each eye implementing display screen 260) to display decoded portions of image frames in decoded buffer 275. Those decoded portions of the image frames can be decoded from encoded image frames stored in image frame buffer 130. Sensors 265 can include gyroscopes, accelerometers, infrared detectors, eye trackers, hand-held controllers, motion detectors, etc. that can be used to determine the viewer's interactions with the VR environment provided by the media content (e.g., determine changes to the field of view provided to the viewer within the VR environment).

Processors 250 can execute stored instructions in memory 255 to implement the decoding and playback techniques disclosed herein.

Figure 3:
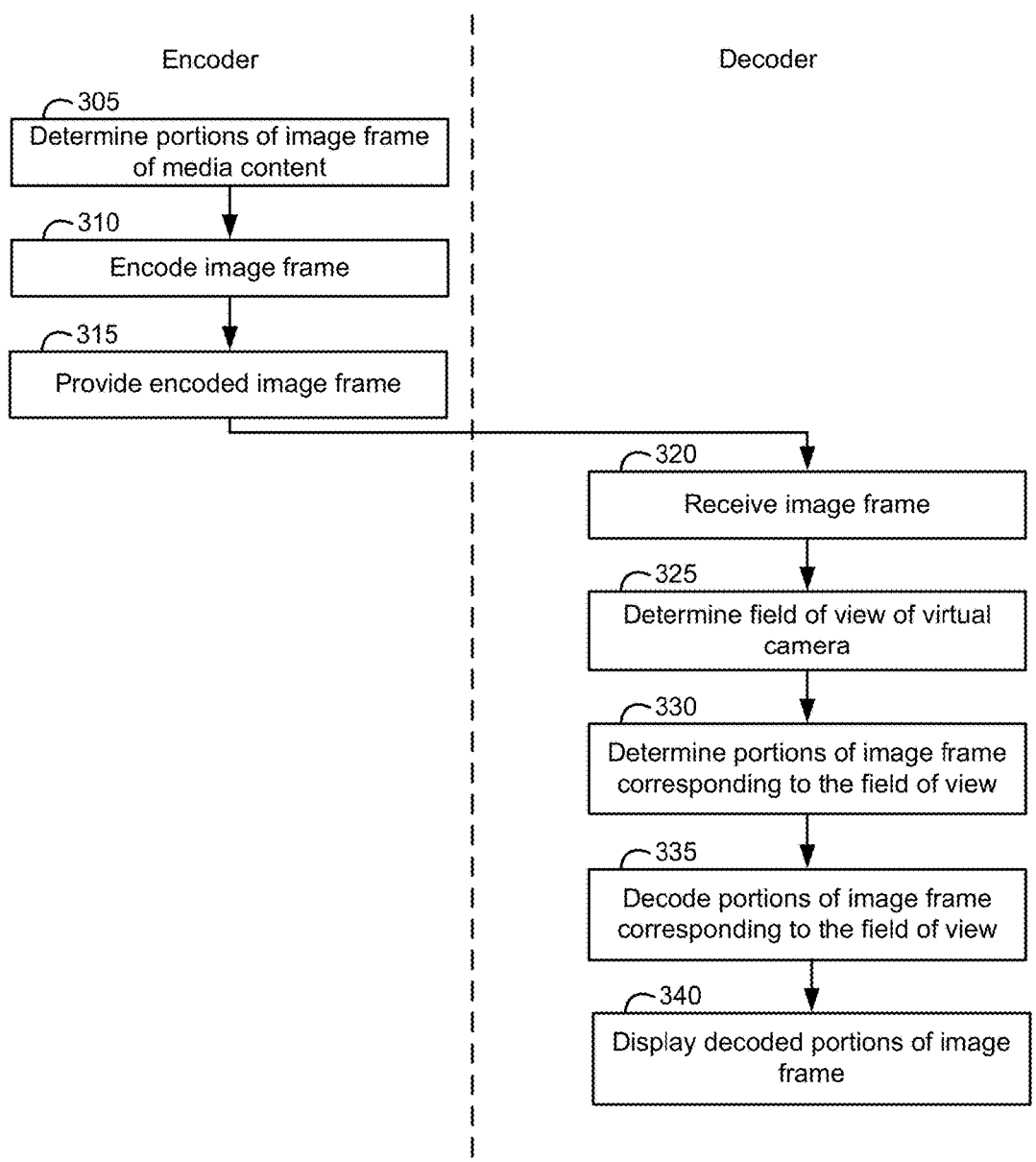
FIG. 3 is a flowchart illustrating an example of decoding a portion of an image frame.
Figure 4:
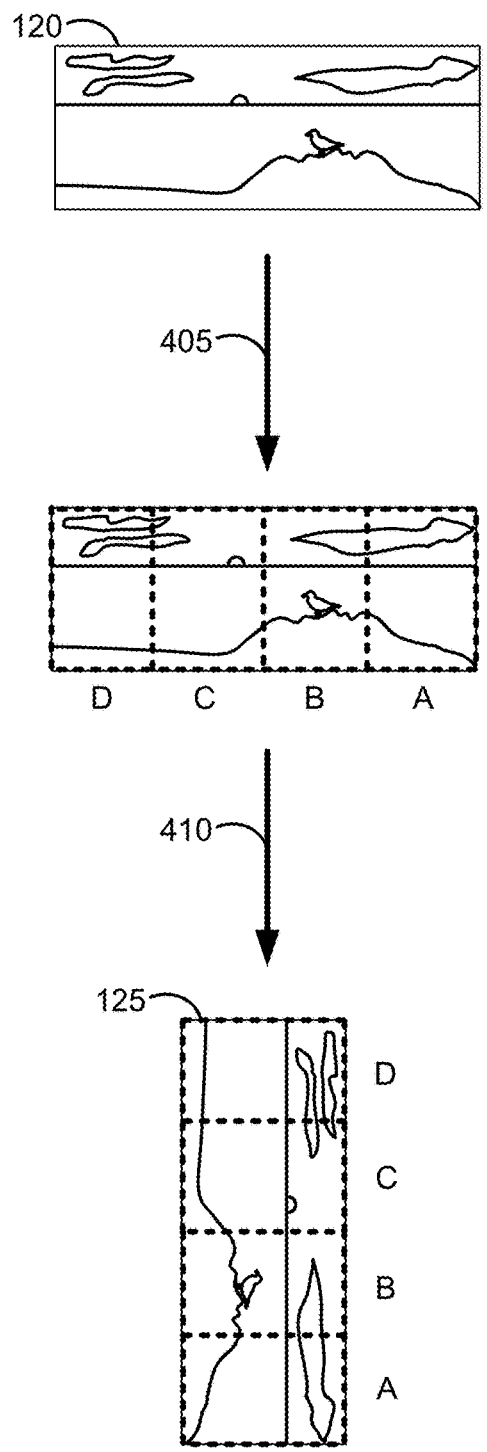
FIG. 4 illustrates an example of encoding media content for decoding a portion of an image frame.

A specific implementation will now be described with reference to FIG. 1, the computing environment of FIG. 2, the flow diagram of FIG. 3, and the examples of FIGS. 4-7. In FIG. 3, encoder 225 of encoding server 110 determines portions of an image frame of media content to be identified with different portions of a projection provided by a VR device (305). In FIG. 4, image frame 120 can be partitioned 405 to determine four different regions of image frame 120.

As an example, if image frame 120 is to be displayed on VR device 115 providing a cylindrical projection, then image frame 120 can be partitioned into a certain number of slices, each of the slices representing a different portion of the cylindrical projection. In FIG. 4, image frame 120 has been partitioned into four slices A-D of equal dimensions, and therefore, each of the portions A-D represents a different 90-degree portion of a 360-degree cylindrical projection. If the left side of slice D represents the 0-degree point of the 360-degree cylindrical projection, then slice D represents 0-90 degrees of the 360-degree cylindrical projection, slice C represents 90-180 degrees, slice B represents 180-270 degrees, and slice A represents 270-360 degrees. The right side of slice A would wrap around the 360-degree cylindrical projection to adjoin with the left side of slice D.

Image frame 120 can be partitioned into any number of slices. For example, image frame 120 can be partitioned into three slices, each representing a different 120-degree portion of the 360-degree cylindrical projection. As another example, image frame 120 can be partitioned into six slices, each representing a different 60-degree portion of the 360-degree cylindrical projection. In some implementations, the slices can be different sizes, for example, one slice representing a 60-degree portion, a second slice representing a 120-degree portion, a third slice representing a 90-degree portion, and two remaining slices each representing different 45-degree portions.

Figure 8:
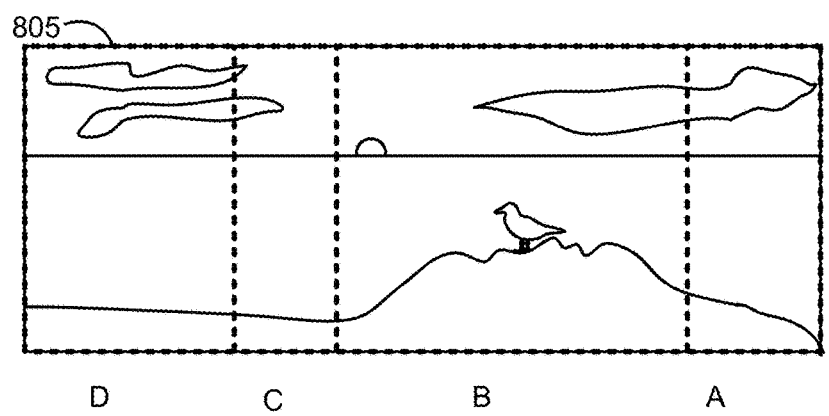
FIG. 8 illustrates another example of encoding media content for decoding a portion of an image frame.

In some implementations, the slices can be determined based on the image content of an image frame. In one example, since slices can vary in size, the boundaries of the slices can be placed in accordance with how viewers might likely be viewing the scene within the VR environment. For example, in FIG. 4, encoder 225 can analyze image frame 120 and determine that viewers would likely view the content provided in the center of image frame 120 since the image content therein provides detail in the foreground (e.g., the bird), sunset in the background, or other details that are the focus of image frame 125. FIG. 8 illustrates another example of encoding media content for decoding a portion of an image frame. In FIG. 8, encoder 225 can determine portions A-D in image frame 805 in FIG. 8 by having slice B be larger than slices A, C, and D. For example, slice B is large enough to incorporate all of the content that the viewer would likely focus on. The remaining slices A, C, and D can be assigned the remaining content of the image frame. As a result, slice B would likely be decoded by a VR device since the field of view would probably be focused on that image content. Slices A and C can be smaller than slice D since they represent the image content adjacent to slice B and might be decoded if the field of view is not fully aligned on slice B. As a result, slice D can be larger than A and C, but represents a portion of image frame 805 that would likely not be decoded since the viewer would have to rotate quite a bit away from the central focus of image frame 805 (e.g., the image content provided by slice B).

In another example, the slices can be determined such that the boundaries of the slices avoid important content such as content that would likely be focused on, as previously discussed. In some implementations, this can include faces, for example, recognized via facial recognition. As a result, a slice can be sized to include an entire face rather than splitting a face across multiple slices since it is not likely that a viewer would only want to observe a part of a face that is engaged in speech during the playback of the media content. In another example, areas of an image frame with particular image quality (e.g., high-texture areas), motion vectors, etc. can be grouped into a slice.

In some implementations, the start-point of the projection using an image frame can be changed. For example, in one frame, the left edge of slice D in FIG. 8 can be set as the start-point, for example, representing 0 degrees within the 360-degree cylindrical projection. Based on the image content, another frame might have the start-point be the left edge of slice C, or even the left edge of slice B (e.g., the edge of the slice corresponding to the focus of the image frame). As a result, some image frames can be offset in terms of their start-points (when mapped to the cylindrical projection) from each other based on the selection of slices (e.g., size, placement, number, etc.) and image content of the image frame.

Next, image frame 120 is encoded (310). For example, in FIG. 4, this can include rotating 410 image frame 120 by 90 degrees in a clockwise direction to generate encoded image frame 125 with slices A-D. In some implementations, image frame 120 can be rotated in a counter-clockwise orientation. Other encoding techniques, such as applying quantization matrices, quantization parameters, etc. can also be performed.

In some implementations, image frame 120 might be rotated first and then slices as depicted in the rotated encoded image frame 125 can be determined. This may be performed because slices as defined by various video coding formats are generally longer along the horizontal axis than the vertical axis. Additionally, slices usually represent one or more full macroblock rows, with an image frame composed of several macroblocks representing different portions (e.g., 16×16 pixels, 8×8 pixels, etc.) of the image frame. Each full row of macroblocks belongs to a different slice. As a result, each slice is a square (e.g., with a 1:1 aspect ratio of encoded image frame 125) or rectangle of macroblock rows. This results in slices "stacked" upon each other as depicted in FIG. 4, with slice A representing a portion of encoded image frame 125 that is above and adjacent to slice B. Slice B is above and adjacent to slice C, and so forth. Each of the slices can be decoded without reference to other slices of the same image frame. Instead, the slices can be decoded with reference to itself or corresponding slices of other image frames.

As previously discussed, in some video coding formats such as AVC, HEVC, and VC-1, image frame 120 can be segmented into slices to encode media content more efficiently. For example, in some scenarios, similar portions of an image frame can be included in the same slice to increase the parallelism of the encoding process, and therefore, decrease encoding time. By contrast, as disclosed herein, the different slices represent different portions of the cylindrical projection and can be used to improve the decoding process. For example, as discussed below, the latency to decode image frames and display the decoded content can be reduced. Moreover, since only a subset of the slices can be decoded, the quality of encoded image frame 125 can be increased, for example, by increasing its resolution. Additionally, if the VR device is battery-operated, reducing the load on its computing resources due to decoding less than a full image frame can increase the battery life. In addition, the VR device can have less memory resources as less image data needs to be copied into memory during the decoding process.

Figure 6:
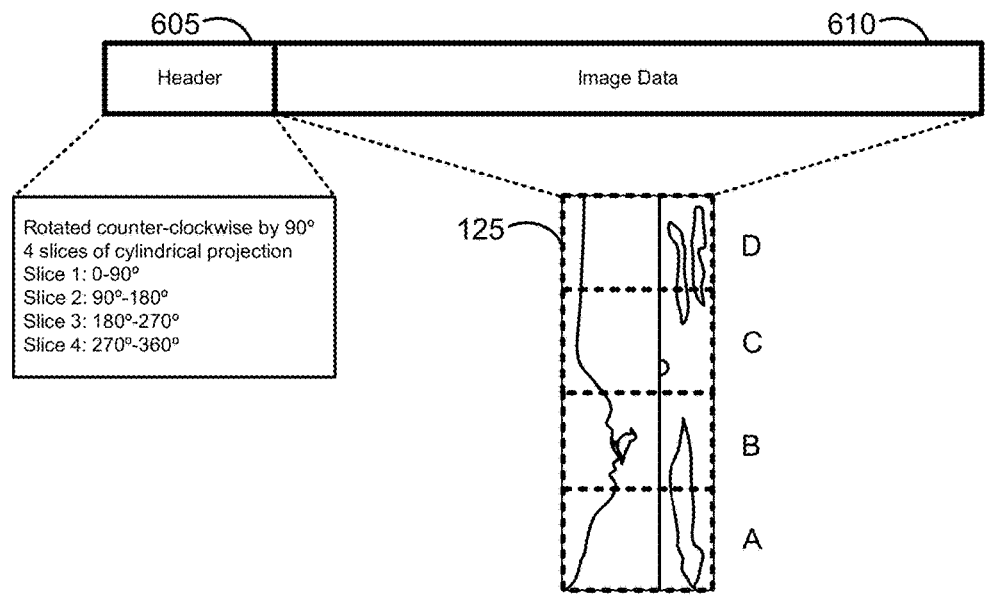
FIG. 6 illustrates an example of providing metadata indicating different portions of an image frame.

In some implementations, metadata representing how image frame 120 was partitioned into slices can be included with image data providing the visual detail of image frame 120. FIG. 6 illustrates an example of providing metadata indicating different portions of an image frame. In FIG. 6, a bitstream includes image data 610 providing encoded image frame 125 and header 605 providing metadata providing details on image frame 125, such as identifying slices A-D. For example, in FIG. 6, header 605 indicates that the encoded image frame 125 provided by image data 610 is rotated clockwise by 90 degrees. Header 605 also indicates the number of slices and the portion of a cylindrical projection that they correspond. In some implementations, sizes or coordinates of slices, or other types of data regarding the slices (e.g., how the slices map to a VR projection) can be provided. Header 605 can be provided for each image frame, or a single header 605 can be used for multiple image frames (e.g., for the entire or portions of the media content). In some implementations, the metadata can be provided in a manifest file providing the playback options (e.g., available video and audio quality levels, subtitles, etc.) of the media content. In some implementations, the metadata can be included in one or more supplemental enhancement information (SEI) messages, for example, as a prefix to the image data of the slices.

In some implementations, the different slices can be encoded based on how other slices are being encoded within the same image frame. For example, the end of one slice can be encoded with encoding parameters (e.g., a quantization parameter representing a compression factor used to compress a portion of an image frame during the encoding process) that are based on one or more other slices. In some implementations, the boundaries of the slices can be encoded based on an average of the quantization parameters (or other encoding parameters) at the boundaries of all of the slices of an image frame or subsequent or prior image frames. This can reduce visual discontinuities at the edges of the slices that might be perceptible to the viewer if the quality of the slices drastically varies from each other, and therefore, improve the quality of the playback experience.

Next, encoded image frame 125 is provided to a VR device (315). For example, encoded image frame 125 can be provided over a communication connection (e.g., the Internet or other network), or on a medium such as a disc, etc. As a result, VR device 115 receives encoded image frame 125 (320) and stores it in image frame buffer 130. Several image frames can be stored within image frame buffer 130.

The field of view of a virtual camera representing a position of the viewer within the VR environment provided by VR device 115 can be determined (325) and used to determine the portions (e.g., slices) of the image frame (330) to be decoded (335) and displayed (340) on a display screen. In some implementations, the decoded content can also be rendered, for example, generating an image from a 2D or 3D model. That image can then be displayed for the viewer.

For example, VR device 115 can use media content to generate an immersive environment for the viewer by simulating the viewer's physical presence within a VR environment. If VR device 115 is a headset and the viewer rotates her head to the left or right, then that physical movement in the physical world should be translated into movement within the VR environment. This should result in the display screen of VR device 115 to update to reflect a new perspective in the VR environment. The viewer's movements or interactions can be captured by a variety of sensors, as previously discussed.

Additionally, encoded image frame 125 should be mapped onto a projection implementing the VR environment. For example, if VR device 115 can implement a cylindrical projection by "wrapping" encoded image frame 125 similar to a cylinder, resulting in encoded image frame 125 capable of providing a full 360-degree view of the VR environment. The viewer's location and perspective within the VR environment is also governed by a virtual camera (or VR camera). If the viewer rotates his head, then the virtual camera should correspondingly rotate. The field of view of the virtual camera represents what the viewer should be seeing on the display screen of VR device 115. As a result, as the virtual camera rotates, the field of view of the virtual camera also changes based on the rotation, resulting in a different portion of the cylindrical projection provided on the display screen of VR device 115.

Figure 5:
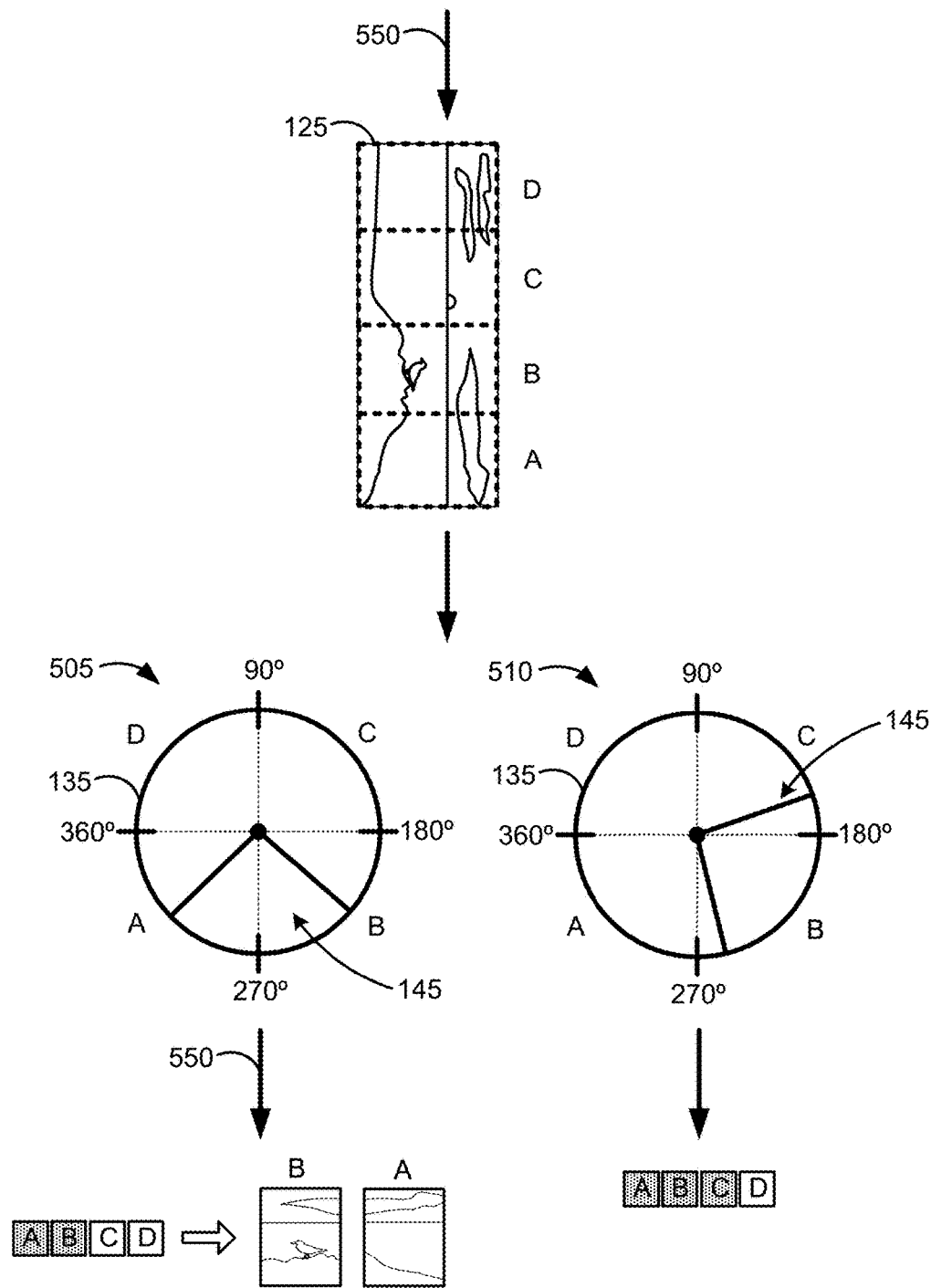
FIG. 5 illustrates an example of decoding a portion of an image frame.

For example, in FIG. 5, encoded image frame 125 is received 550 by VR device 115 and stored in image frame buffer 130. Metadata regarding encoded image frame 125 (e.g., header 605 in FIG. 6) is also received and stored. Next, in FIG. 5, field of view 145 of the virtual camera is determined at time 505. For example, in FIG. 5, at time 505, cylindrical projection 135 is shown from a top-down perspective (e.g., top-down view of cylindrical projection 135 in FIG. 1). Field of view 145 at time 505 is a 90-degree field of view from the 315-degree point of cylindrical projection 135 (within slice A) to the 225-degree point (within slice B). This degree range of field of view 145 is used to determine which slices of encoded image frame 125 should be decoded and displayed to update the viewer's perspective within the VR environment.

For example, using the metadata within header 605 in FIG. 6, the slices that include image data within the 225-degree to 315-degree range is identified. Since slices A and B include portions within that range, this results in the identification of slices A and B. As a result, in FIG. 5, slices A and B are decoded 550 and portions of those slices within field of view 145 are displayed. The decoding process can also include rotating the decoded slices (e.g., counter-clockwise by 90 degrees if they were rotated clockwise by 90 degree during encoding). By contrast, slices C and D can remain non-decoded since they do not provide any content within field of view 145 at time 505. In other implementations, slices can be identified without using header 605. For example, each slice might represent 25% (i.e., 90 degrees) of the 360-degree cylindrical projection, and therefore, VR device 115 can determine whether a slice falls within field of view 145 since the slices are relatively fixed for each encoded image frame.

If field of view 145 changes, for example at time 510, then a new degree range can be identified and it can be determined whether other slices should then be decoded. For example, in FIG. 5, field of view 145 has shifted at time 510 (i.e., the virtual camera now provides a new field of view) due to the viewer's interactions, and therefore, the display screen of VR device 115 should be updated to display the portions of slices B and C within field of view 145. If the same image frame from time 505 is being used (i.e., the same image frame representing the VR environment for the cylindrical projection), this results in slice C having to be decoded with slices B and C displayed (slice A is no longer displayed, but still remains decoded). As a result, slices A-C have been decoded, as indicated by the shading in FIG. 5. By contrast, slice D remains non-decoded since it has not been identified as including image content within field of view 145 at times 505 and 510.

Figure 9:
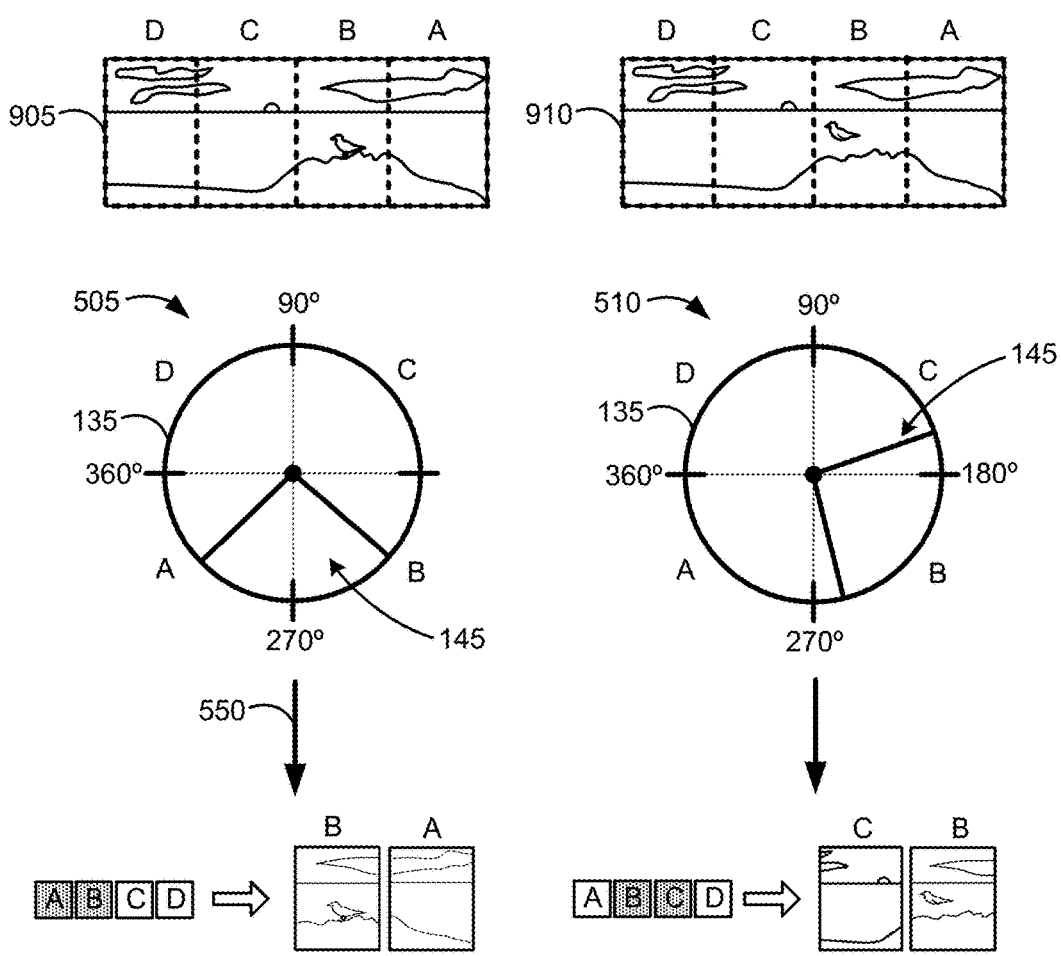
FIG. 9 illustrates an example of decoding portions of multiple image frames.

If another image frame is being used at time 510 than time 505 then portions of the other image frame can be decoded. FIG. 9 illustrates an example of decoding portions of multiple image frames. In FIG. 9, at time 505, slices A and B of image frame 905 can be decoded as in the prior example. At time 510, a new image frame is to be displayed in addition to updating the display to provide image content from slices corresponding to the updated field of view 145. As a result, slices B and C of image frame 910 should be decoded and displayed since field of view 145 corresponds to image content within slices B and C of the new image frame.

Figure 10:
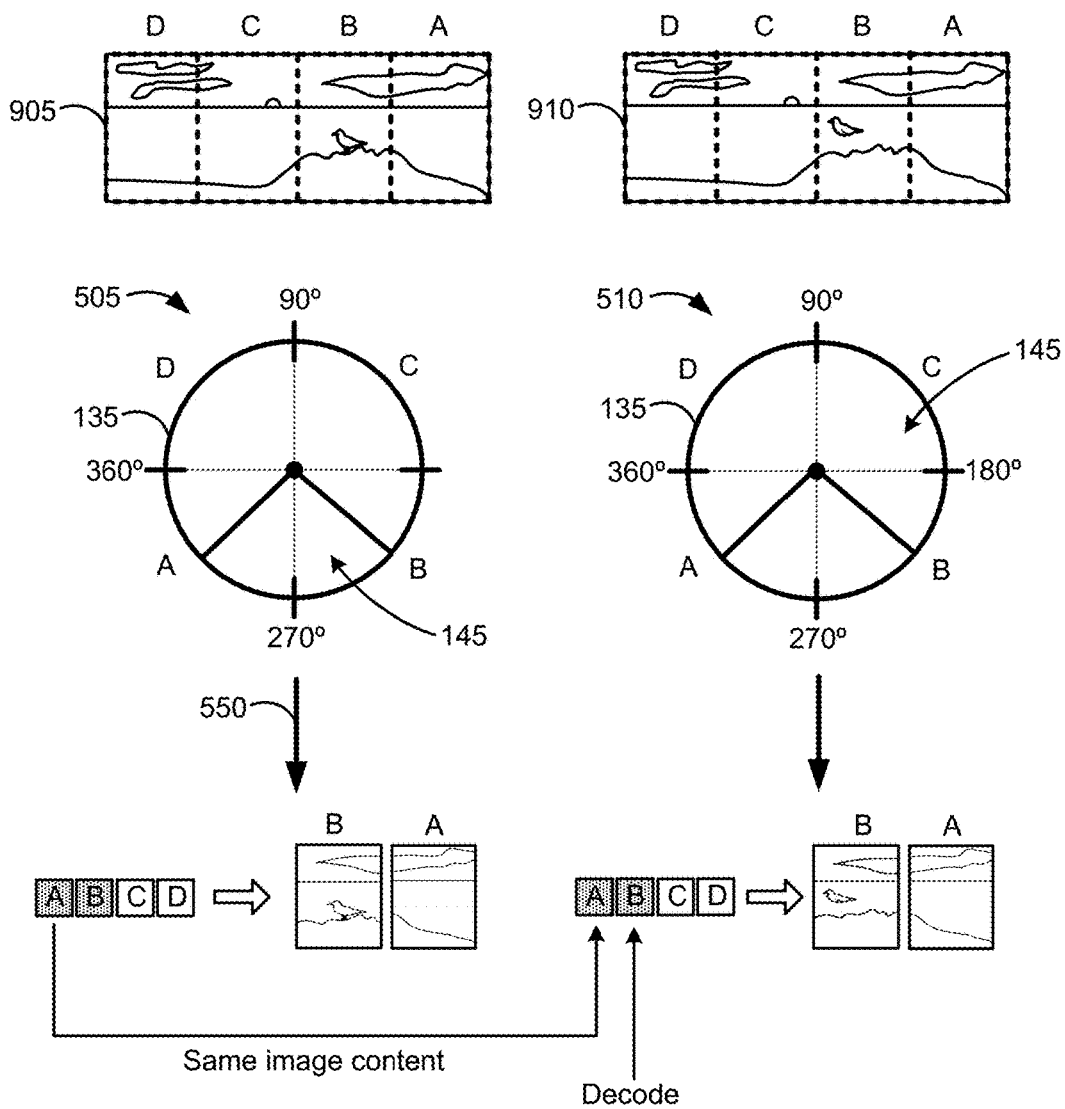
FIG. 10 illustrates another example of decoding a portion of an image frame.

In some implementations, a subset of the slices has changed in terms of image content from image frame to image frame. FIG. 10 illustrates another example of decoding a portion of an image frame. In FIG. 10, image frame 910 is similar to image frame 905 except for the image content provided by slice B. That is, slices A, C, and D of image frames 905 and 910 provide similar image content, but slice B of image frame 905 and slice B of image frame 910 are different (e.g., as depicted with the bird in the foreground flying away in slice B of image frame 910). In some implementations, slices that are recognized as being the same (e.g., providing similar image content) from one image frame to another can be identified and only the slices that provide new image content can be decoded if they are within field of view 145. For example, in FIG. 10, at time 510, only slice B can be decoded from an encoded image frame 910. Since slice A of image frame 910 provides the same image content as slice A of image frame 905, there is no need to decode slice A of image frame 910 if slice A of image frame 905 was previously decoded and still stored within a buffer (e.g., decoded buffer 275 of VR device 115). This allows for a further reduction in the computational load of decoder 280, resulting in reduced latency to decode an encoded image frame 910. In some implementations, decoder 280 can analyze image frames and determine whether slices of one image frame and another image frame are similar. In some implementations, encoder 225 might provide that information. In some implementations, encoder 225 might only provide slice B of image frame 910 (i.e., not provide the data related to slices A, C, and D of image frame 910) to VR device 115, and decoder 280 can determine that those missing slices provide the same image content as slices A, C, and D of image frame 905, and therefore, those slices of image frame 905 can be decoded when needed to be displayed with slice B of image frame 910.

In some implementations, to decode a slice, slices of one or more reference image frames might also be decoded. In some implementations, the entire reference image frames might be decoded.

In some implementations, slices can be identified during encoding without rotations. For example, the encoder and decoder can be designed to work with slices that are taller than they are wide (i.e., longer in the vertical axis than the horizontal axis). Though the above examples include a cylindrical projection implementing the VR environment, other types of projections can also be used. For example, the techniques disclosed herein can also be applied with cubic projections, spherical projections, etc. Additionally, the techniques disclosed herein can be used in more than VR headsets, for example, 360-degree wrap-around monitor setups, VR chambers, etc.

Figure 7:
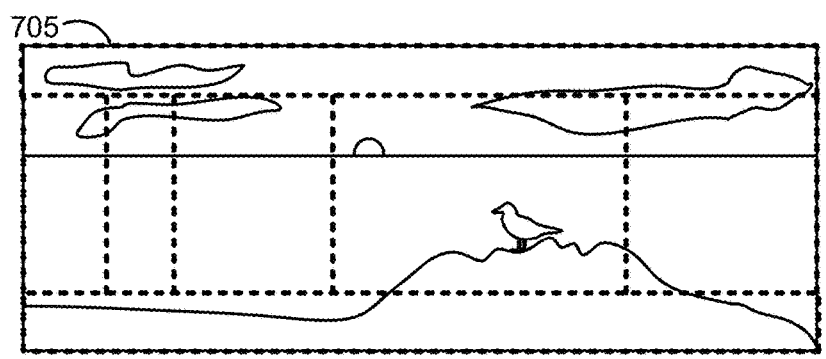
FIG. 7 illustrates another example of encoding media content for decoding a portion of an image frame.

Some of the examples disclosed herein utilize slices to split an image frame into different portions. However, as discussed previously, different techniques to identify portions of an image frame can also be used. For example, tiles and FMOs can also be used with the techniques disclosed herein. FIG. 7 illustrates another example of encoding media content for decoding a portion of an image frame. In FIG. 7, each of the different portions of image frame 705 are different tiles. In some implementations, header 605 as in FIG. 6 can be used to provide metadata regarding the tiles so that the image frame can be decoded using the techniques disclosed herein.

In some implementations, specific slices of image frames can be requested by VR device 115 from encoding server 110 in FIGS. 1 and 2. For example, based on field of view 145 of virtual camera 140, the slices that should be displayed can be identified, as previously discussed. Those identified slices can be requested on a slice-by-slice basis, and therefore, VR device 115 can request slices A and B while not requesting C and D. When encoding server 110 receives the request, it can provide the corresponding image data for slices A and B.

Many of the above examples discuss not decoding slices of an image frame if they provide image data that is outside of the field of view. However, in some implementations, the slices within the field of view can be decoded first (and then displayed) and the slices outside of the field of view can be subsequently decoded in anticipation of the image content coming within the field of view. In some implementations, the slices that are not decoded can be decoded in an order corresponding to the field of view changing within the VR environment. For example, if two slices in the middle of the image frame (e.g., slices B and C of encoded image frame 125 in FIG. 1) are within the field of view and the field of view pans to the left (but slices B and C are still the only slices within the field of view), then slice D can be decoded before slice A since it is to the left of slices B and C.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer implemented method comprising:
  receiving, by a virtual reality (VR) device, an image frame of media content implementing a VR environment;
  determining, by the VR device, a first field of view of a virtual camera in the VR environment implemented by the VR device, the first field of view corresponding to a first portion of a VR projection on which the image frame is to be mapped;
  determining, by the VR device, a first portion of the image frame including image data that corresponds to the first field of view of the virtual camera in the VR environment, wherein the first portion of the image frame, when encoded, is longer on a horizontal axis than on a vertical axis;

decoding, by the VR device, the first portion of the image frame including the image data corresponding to the first field of view of the virtual camera to generate a first decoded portion of the image frame, wherein a second portion of the image frame not corresponding to the first field of view is not decoded;

rotating the first decoded portion of the image frame in relation to the image frame such that the first portion of the image is longer on the vertical axis than on the horizontal axis; and displaying, by the VR device, the first decoded portion of the image frame on a display of the VR device.

2. The computer implemented method of claim 1, further comprising:

determining, by the VR device, that the virtual camera has changed to provide a second field of view corresponding to a second portion of the VR projection, the first portion and the second portion of the VR projection being different;

determining, by the VR device, that the second portion of the image frame that is not decoded includes image data corresponding to the second field of view of the virtual camera in the VR environment;

decoding, by the VR device, the second portion of the image frame that includes image data corresponding to the second field of view of the virtual camera to generate a second decoded portion of the image frame; and displaying, by the VR device, the second decoded portion of the image frame on the display of the VR device.

3. The computer implemented method of claim 1, wherein the first portion of the image frame is a slice, one or more tiles, or one or more flexible macroblock orderings (FMOs) of the image frame.

4. A system comprising:

one or more processors and memory configured to:

determine a first field of view within a virtual reality (VR) environment;

determine a first portion of an image frame of the VR environment corresponds to the first field of view, wherein the first portion of the image frame, when encoded, is longer on a horizontal axis than on a vertical axis;

decode the first portion of the image frame, wherein the image frame also includes a second portion outside the first field of view that is not fully decoded; and in conjunction with decoding the first portion of the image frame, rotate the first portion of the image frame in relation to the image frame such that the first portion of the image frame is longer on the vertical axis than on the horizontal axis.

5. The system of claim 4, wherein the one or more processors and memory are further configured to:

determine that a perspective of the VR environment has changed to a second field of view;

determine that the second portion of the image frame corresponds to the second field of view; and decode the second portion of the image frame.

6. The system of claim 4, wherein the one or more processors and memory are further configured to:

display the decoded first portion of the image frame on a display screen, wherein the second portion of the image frame is not displayed.

7. The system of claim 4, wherein the first portion is a slice, one or more tiles, or one or more flexible macroblock orderings (FMOs) of the image frame.

8. The system of claim 4, wherein the one or more processors and memory are configured to determine that the first portion of the image frame corresponds to the first field of view includes determining that the first field of view corresponds to a portion of a VR projection on which the image frame is mapped, the portion of the VR projection corresponding to the first portion of the image frame.

9. A computer program product comprising one or more non-transitory computer-readable media having computer instructions stored therein, the computer program instructions being configured such that, when executed by one or more computing devices, the computer program instructions cause the one or more computing devices to:

determine a first field of view within a virtual reality (VR) environment;

determine a first portion of an image frame of the VR environment corresponds to the first field of view, wherein the first portion of the image frame, when encoded, is longer on a horizontal axis than on a vertical axis;

decode the first portion of the image frame, wherein the image frame includes a second portion outside the first field of view that is not fully decoded; and in conjunction with decoding the first portion of the image frame, rotate the first portion of the image frame in relation to the image frame such that the first portion of the image frame is longer on the vertical axis than on the horizontal axis.

10. The computer program product of claim 9, the computer program instructions being further configured to cause the one or more computing devices to:

determine that the a perspective of the VR environment has changed to a second field of view;

determine that the second portion of the image frame corresponds to the second field of view; and decode the second portion of the image frame.

11. The computer program product of claim 9, the computer program instructions being further configured to cause the one or more computing devices to:

display the decoded first portion of the image frame on a display screen, wherein the second portion of the image frame is not displayed.

12. The computer program product of claim 9, wherein the first portion is a slice, one or more tiles, or one or more flexible macroblock orderings (FMOs) of the image frame.

13. The computer program product of claim 9, the computer program instructions being configured to cause the one or more computing devices to determine that the first portion of the image frame corresponds to the first field of view by determining that the first field of view corresponds to a portion of a VR projection on which the image frame is mapped, the portion of the VR projection corresponding to the first portion of the image frame.

14. A system comprising:

one or more processors and memory configured to:

identify portions of an image frame of media content implementing a virtual reality (VR) environment, each of the portions providing image data corresponding to a different field of view within the VR environment;

in conjunction with encoding of the image data, rotate the portions of the image frame in relation to the image frame; and encode the portions of the image frame of the media content to generate an encoded image frame.

15. The system of claim 14, wherein the encoded image frame includes portion metadata regarding the identified portions and the corresponding field of views of the identified portions.

\* \* \* \* \*